United States Patent
Boettiger

(10) Patent No.: US 7,478,752 B2
(45) Date of Patent: Jan. 20, 2009

(54) METHOD OF ENTERING AN AUTHORIZATION CODE INTO A CHIP CARD TERMINAL

(75) Inventor: Volker Boettiger, Munich (DE)

(73) Assignee: International Business Machines Corporation, Armonk, NY (US)

( * ) Notice: Subject to any disclaimer, the term of this patent is extended or adjusted under 35 U.S.C. 154(b) by 742 days.

(21) Appl. No.: 10/714,289

(22) Filed: Nov. 13, 2003

(65) Prior Publication Data
US 2004/0118913 A1 Jun. 24, 2004

(30) Foreign Application Priority Data
Dec. 18, 2002 (EP) .................................. 02102795

(51) Int. Cl.
*G06K 7/08* (2006.01)
(52) U.S. Cl. ........................................ 235/451; 235/492
(58) Field of Classification Search .................. 235/375, 235/379, 380, 382, 382.5, 492, 451; 705/41, 705/42
See application file for complete search history.

(56) References Cited

U.S. PATENT DOCUMENTS

| | | | | |
|---|---|---|---|---|
| 3,641,499 A | * | 2/1972 | Housman | 235/380 |
| 4,839,506 A | * | 6/1989 | Homma et al. | 235/379 |
| 5,017,766 A | * | 5/1991 | Tamada et al. | 235/492 |
| 5,034,597 A | * | 7/1991 | Atsumi et al. | 235/380 |
| 5,050,207 A | * | 9/1991 | Hitchcock | 379/93.19 |
| 5,130,519 A | * | 7/1992 | Bush et al. | 235/380 |
| 5,180,902 A | * | 1/1993 | Schick et al. | 235/380 |
| 5,239,166 A | * | 8/1993 | Graves | 235/380 |
| 5,627,355 A | * | 5/1997 | Rahman et al. | 235/380 |
| 5,698,836 A | * | 12/1997 | Fujioka | 235/492 |
| 5,877,482 A | * | 3/1999 | Reilly | 235/380 |
| 6,188,309 B1 | * | 2/2001 | Levine | 340/5.66 |

OTHER PUBLICATIONS

Security Dynamics "Controlling Access to the Corporate Network", 1997, pp. 1 through 8.
David B. Everett "Smart Card Tutorial", 1992 and 1993, Parts 1 and 9 (full text at http://www.smartcard.co.uk/tutorials/sct-itsc.pdf).

* cited by examiner

*Primary Examiner*—Ahshik Kim
(74) *Attorney, Agent, or Firm*—Ronald A. Kaschak; Daniel E McConnell

(57) ABSTRACT

An authorization code is entered into a chip card terminal from a chip card. The authorization code is first entered into a chip card and stored in a secret memory location. A state on the chip card is temporarily changed from a first state to a second state. When the chip card is inserted into a chip card terminal within a pre-defined period of time, the authorization code is transmitted to the chip card terminal and the state is reset from the second state to the first state.

6 Claims, 2 Drawing Sheets

METHOD OF ENTERING AN AUTHORIZATION CODE INTO A CHIP CARD TERMINAL

TECHNICAL FIELD

The present invention relates to the field of chip cards, which are also referred to as smart cards, data cards or integrated circuit cards, and more particularly, to chip card authentication.

BACKGROUND OF THE INVENTION

The use of chip cards is wide spread for a variety of applications, including electronic payment, electronic cash and access control systems. Typically a user has to insert the chip card into a terminal having a card reader. In order to enable a desired transaction the user has to input an authorization code into a keyboard of the terminal.

When the user has entered a valid authorization code the transaction is enabled. For example, payments at gas stations or other points of sales are usually performed this way by means of a credit card having an integrated circuit chip. The typical method for authenticating the user to the card by means of an authorization code involves the input of a personal identification number (PIN) into the terminal. The PIN is verified by means of the chip card. This verification is done by comparing the PIN with a reference PIN stored in a secret area of the non-volatile memory of the chip card.

This usual procedure of using smart cards for providing payments at points of sale has several security risks. One risk is that the user inputs his or her PIN information through the keyboard of the terminal which is owned by a third party. The keyboard can be tampered with by the third party to read the user PIN number.

Another risk is that the terminals are typically located in public areas with no or only limited confidentiality. When the user enters his or her PIN number by means of the keyboard of the chip card terminal this can be easily observed by other customers. Especially this situation can occur when customers are queuing up in front of a point of sale terminal.

Another disadvantage of entering the PIN number into the keyboard of the chip card terminal is that users frequently make mistakes when entering the PIN number or have forgotten the correct PIN number. This requires re-entering of the PIN number such that an extended period of time for the payment transaction is required. This is especially annoying for other customers who are standing in line in front of a crowded point of sale terminal, such as in a gas station or supermarket.

The present invention therefore aims to provide an improved method of entering an authorization code into a chip card terminal and a corresponding computer program and chip card.

SUMMARY OF THE INVENTION

The present invention provides for an improved method of entering an authorization code into a chip card terminal whereby the authorization code is not directly entered into the chip card terminal but into the chip card itself. The authorization code is stored in a memory location of the chip card for a predetermined period of time.

During that period of time the authorization code can be transmitted from the memory location of the chip card to a chip card terminal. After the pre-defined period of time or after transmission of the authorization code the authorization code is erased from the memory location.

In accordance with one embodiment of the invention the authorization code is an authentication code, such as a PIN number. For access control applications, such as access control of buildings or other sites with restricted access, the authorization code can be a secret access code for authorizing access to the access-restricted site. Alternatively or in addition other data can be entered for transmission to the chip card terminal, such as a transaction number (TAN), a payment amount and/or a payment code indicating the purpose of the payment.

For example at a gas station the user can enter the number of the gasoline pump in addition to the PIN. The number of the gasoline pump is transmitted to the chip card terminal in addition to the PIN. This way it can be prevented that the wrong payment amount is deducted for another gasoline pump which the user has not used to fuel his or her car.

In accordance with a further preferred embodiment of the invention an aural, visual and/or haptic signal is outputted when the authorization code has been successfully entered into the chip card. For example the authorization code is verified by the chip card by means of reference verification data stored in a secured area of the memory of the chip card.

After successful verification the output signal is generated in order to inform the user that he or she entered a valid authorization code and that the chip card is in a state enabling the transmission of the previously entered authorization code to a chip card terminal. This way it can be prevented that the user has to re-enter his or her authorization code at the point of sale when a number of other users are waiting in line behind the user.

In accordance with a further embodiment of the invention the signal is switched off after a pre-defined period of time or after the transmission of the authorization code to the chip card terminal has been successfully completed, whichever occurs earlier.

In accordance with a further embodiment of the invention the user needs to continuously perform a pre-defined input action to maintain the enabling state of the chip card. For example, the user has to place his or her digit on a sensor element on the chip card, such as a photo element. When the user removes his or her finger from that sensor the chip card is reset and the transmission of the authorization code to chip card terminal is disabled. This way misuse of the chip card after the authorization code has been entered is prevented.

In accordance with another embodiment of the invention a bending or flexural sensor or switch is provided to detect an unsecure situation. For example if an attacker tries to take away the chip card from the user by physical force the chip card will undergo an elastic deformation which is sensed such that the authorization code is erased from the memory location of the chip card.

In accordance with a further embodiment of the invention various elements of the user interface are not integrated into the chip card itself but in an electronic wallet. The electronic wallet has a slot for inserting the chip card in order to connect the chip card to the various external interface units. For example the electronic wallet can have a keyboard and a display which are connected to the chip card when the chip card is inserted in the electronic wallet.

In accordance with a further embodiment of the invention the chip card is also used for service functions such as changing a PIN. The new PIN is entered into the chip card by means of the keyboard of the chip card or through the electronic wallet and confirmed.

It is to be noted that the present invention is particularly advantageous for making the usage of chip cards more secure and convenient. In particular the present invention provides for improved protection of the confidentiality of the authorization code.

Another advantage is that the transaction time for providing a payment at a point of sale is reduced as manually entering the authorization code in the chip card terminal at the points of sale and re-entering of a previously incorrectly entered authorization code can be prevented.

BRIEF DESCRIPTION OF THE DRAWINGS

The following embodiments of the invention will be described in greater detail by making reference to the drawings in which.

DETAILED DESCRIPTION OF THE INVENTION

Figure 1:
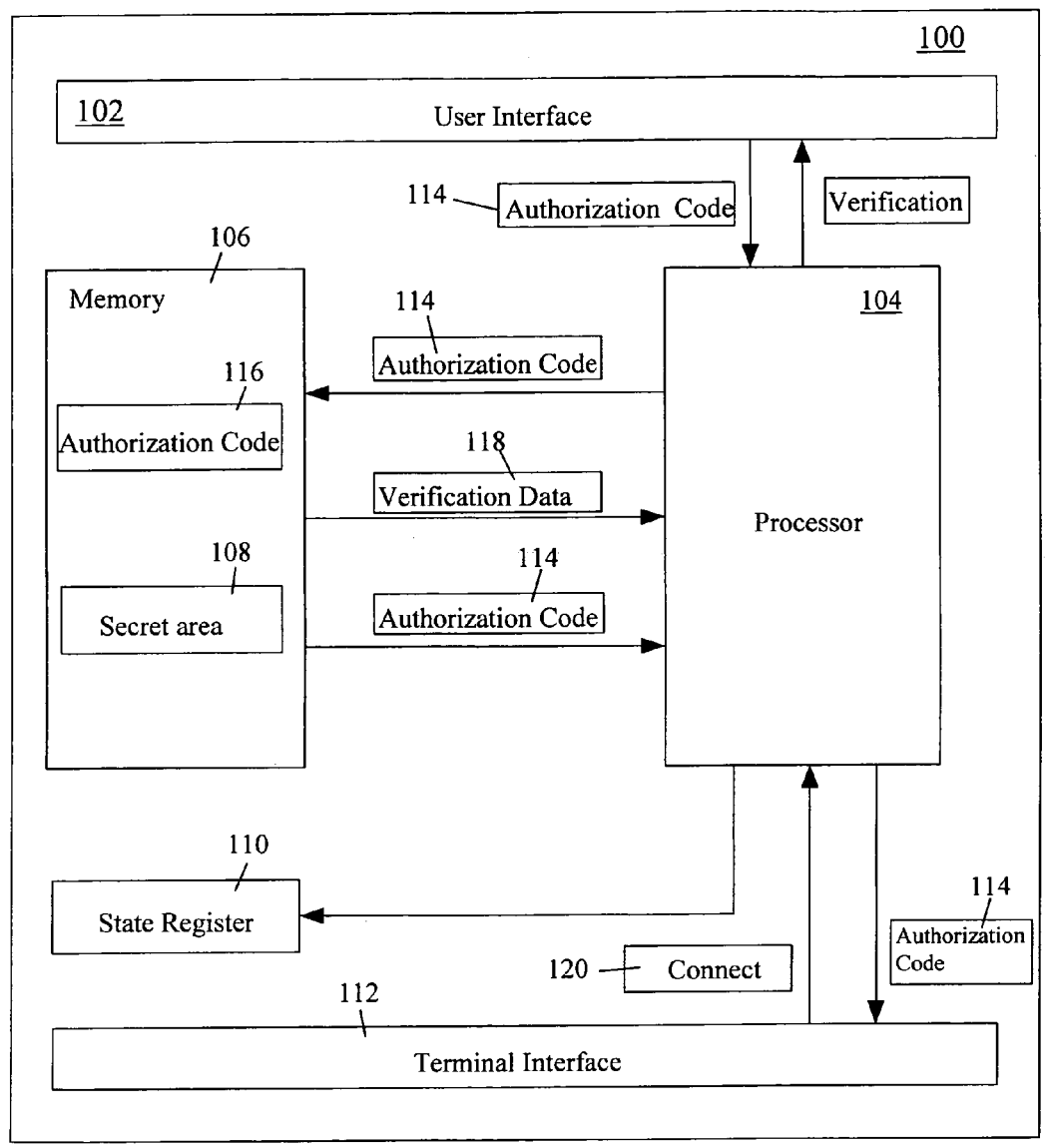
FIG. 1 is a block diagram of an embodiment of a chip card.

FIG. 1 schematically shows a chip card 100. Chip card 100 has a user interface 102. User interface 102 can comprise various elements, such as a keyboard, a display unit, a speaker, a light emitting diode and/or other input and output devices for providing an interface to the user. All of the elements of the user interface 102 can be integrated into chip card 100.

Alternatively some or all of the elements of user interface 102 can be provided by an electronic wallet. In this instance chip card 100 needs to be inserted into the electronic wallet in order to couple chip card 100 to the respective user interface devices.

Further chip card 100 has a microprocessor 104 which is or can be coupled to user interface 102. Microprocessor 104 is coupled to memory 106 of chip card 100. Memory 106 has non-volatile, secret memory location 108 for storage of secret data. For example a reference authorization code is stored in memory location 108. For improved protection of the reference authorization code it is preferred that the reference authorization code is encrypted.

Chip card 100 has state register 110 which is coupled to microprocessor 104. State register 110 serves to store state information which indicates whether chip card 100 is enabled to transmit the authorization code to a chip card terminal.

Further chip card 100 has terminal interface 112. Terminal interface 112 serves to couple chip card 100 to an external chip card terminal.

In operation a user of the chip card 100 inputs an authorization code, such as a PIN number, via user interface 102. From user interface 102 the authorization code 114, which has been inputted by the user, is provided to processor 104 which stores authorization code 114 in memory location 116 of memory 106.

Next processor 104 reads verification data 118 from secret memory location 108. For example verification data 118 contains an encrypted reference authorization code. Processor 104 decrypts the reference authorization code contained in verification data 118 and compares reference authorization code and authorization code 114. If both codes are the same authorization is completed.

In response processor 104 writes a status bit to state register 110. The status bit indicates that transmission of the authorization code 114 from memory location 116 to an external chip card terminal is enabled. Further processor 104 starts a timer.

Preferably processor 104 provides on output signal to user interface 102 in order to inform the user that the entered authorization code 114 is correct and that the transmission of the authorization code 114 is enabled.

When chip card 100 is subsequently inserted into the card reader of a chip card terminal this is signaled to processor 104 from terminal interface 112 by means of signal 120 indicating the connection to the external chip card terminal. Next processor 104 checks state register 110 and the timer. When the status bit is set in state register 110 and the timer is not expired, processor 104 reads authorization code 114 from memory location 116 and transmits authorization code 114 via terminal interface 112 to the chip card terminal.

As a consequence the user does not need to enter authorization code 114 directly into the chip card terminal. This way the protection of the confidentiality of the authorization code 114 is improved. Another advantage is that other users who wait at a point of sale do not have to wait until user of chip card 100 has correctly entered his or her authorization code as the user can enter his or her authorization code 114 while standing in line in front of the point of sale check out terminal.

After transmission of the authorization code 114 or after the timer is expired, state register 110 is reset. Preferably processor 104 generates a corresponding output signal for user interface 102 in order to inform the user that the transmission is disabled now. Further the authorization code is erased from memory location 116.

As an alternative to the above described procedure an authorization signal is outputted from chip card 100 to the external chip card terminal rather than the authorization code 114 itself. The authorization signal indicates to the external chip card terminal that the correct authorization code has been entered into the card and that authorization is complete. This has the additional advantage that when the card is stolen after entering the authorization code 114, the authorization code 114 is not outputted by the chip card.

Figure 2:
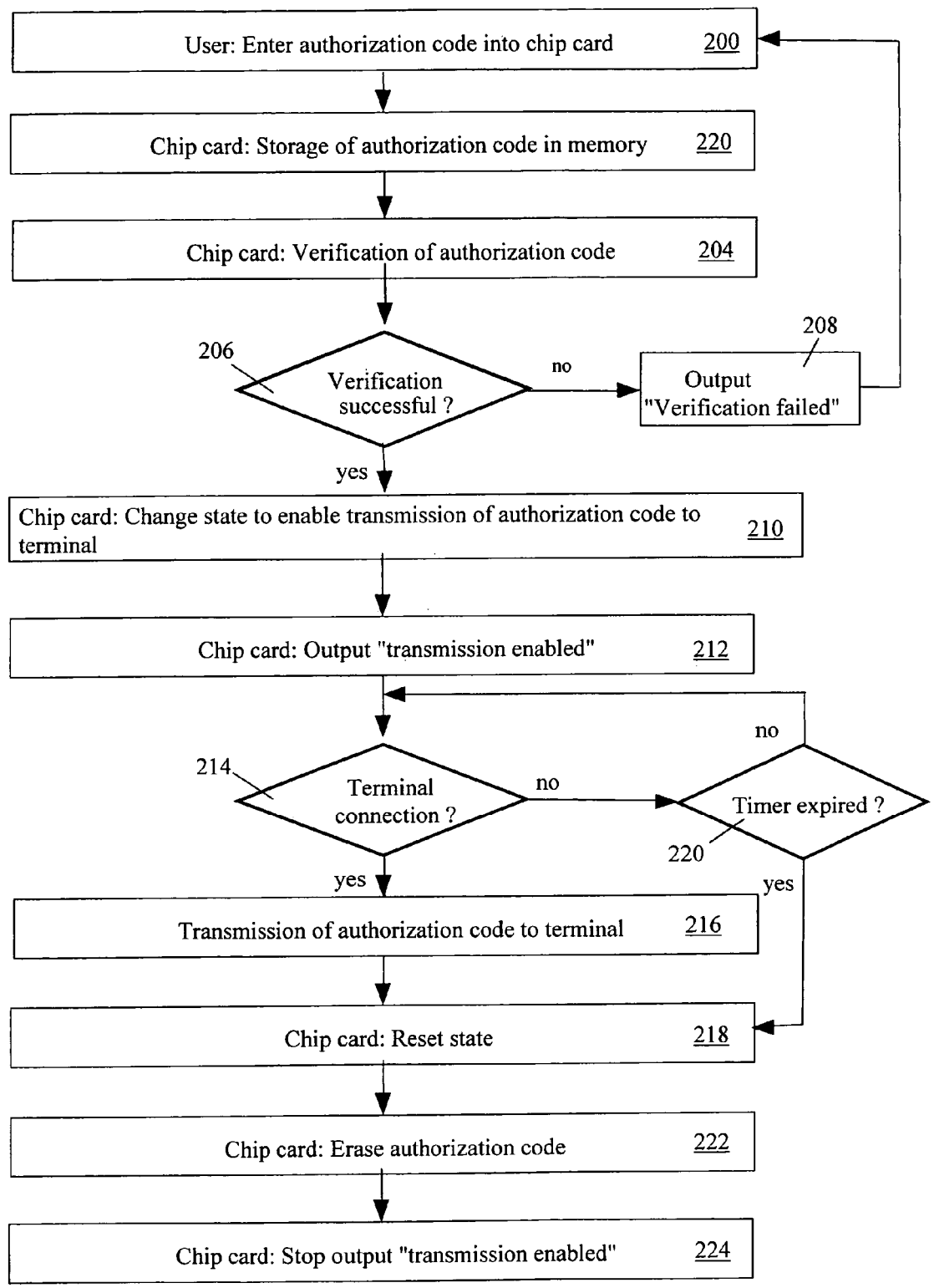
FIG. 2 is illustrative of a flow chart for performing a method of the invention.

FIG. 2 illustrates a corresponding flow chart. In step 200 the user enters his or her authorization code into the chip card. In step 202 the authorization code is stored in an unsecure portion of the memory of the chip card. In step 204 the chip card verifies the authorization code by means of secret verification data which is stored in a secure memory location which is only accessible by the processor of the chip card.

If the verification in step 206 is not successful, i.e. the authorization card is not correct, a corresponding output message is provided to the user in step 208 and the user is prompted to re-enter its authorization code in step 200.

In case of successful verification the chip card changes its state in step 210 to enable the transmission of the authorization code to an external chip card terminal. For this purpose a corresponding output message is generated by the chip card such that the user is informed that the chip card is in an enabled state.

If a terminal connection is established in step 214, the authorization code is transmitted to the external chip card terminal in step 216 and the chip card resets its state in step 218.

If no terminal connection is detected in step 214, the control goes to step 220. If the timer has not expired yet, the control goes back to step 214 in order to check again whether a terminal connection has been established or not.

If it is determined in step 220 that the timer has expired, then control goes to step 218 in order to reset the state of the chip card in order to disable the transmission of the authorization code to the external chip card terminal.

In step 222 the authorization code in the non-secure memory location is erased by the chip card; this is necessary in order to ensure that the chip card is not misused if it gets into the possession of an unauthorized user. Further the output of the message "transmission enabled" via the user interface of the chip card is discontinued in step 224. Instead the message "transmission disabled" is displayed.

What is claimed is:

1. A method of entering an authorization code into a chip card terminal, the method comprising the steps of:
   entering the authorization code into a chip card;
   storing the authorization code in a memory location of the chip card;
   verifying the authorization code, and
   changing the state of the chip card from a first state to a second state to enable transmission of the authorization code from the memory location to the chip card terminal when the chip card is coupled to the chip card terminal within a pre-defined period of time only in the case of a successful verification of the authorization code and resetting the state from the second to the first state.

2. A method of entering an authorization code into a chip card terminal, the method comprising the steps of:
   entering the authorization code into a chip card;
   storing the authorization code in a memory location of the chip card; and
   changing a state of the chip card from a first state to a second state to enable transmission of the authorization code from the memory location to the chip card terminal when the chip card is coupled to the chip card terminal within a pre-defined period of time and resetting the state from the second to the first state;
   wherein an aural, visual or haptic signal is outputted when the state is changed from the first state to the second state.

3. The method of claim 2, whereby the signal is switched off after the pre-defined period of time or after transmission of the authorization code to the terminal.

4. A method of entering an authorization code into a chip card terminal, the method comprising the steps of:
   entering the authorization code into a chip card;
   storing the authorization code in a memory location of the chip card;
   changing a state of the chip card from a first state to a second state to enable transmission of the authorization code from the memory location to the chip card terminal when the chip card is coupled to the chip card terminal within a pre-defined period of time and resetting the state from the second to the first state; and
   maintaining the second state only if a user continuously performs a predetermined input action during the pre-defined period of time.

5. A method of entering an authorization code into a chip card terminal, the method comprising the steps of:
   entering the authorization code into a chip card;
   storing the authorization code in a memory location of the chip card;
   changing a state of the chip card from a first state to a second state to enable transmission of the authorization code from the memory location to the chip card terminal when the chip card is coupled to the chip card terminal within a pre-defined period of time and resetting the state from the second to the first state;
   entering an amount or a transaction code into the chip card; and
   transmitting the amount or the code to the terminal when the authorization code is transmitted to the terminal.

6. A method of entering an authorization code into a chip card terminal, the method comprising the steps of:
   entering the authorization code into a chip card;
   storing the authorization code in a memory location of the chip card;
   changing a state of the chip card from a first state to a second state to enable transmission of the authorization code from the memory location to the chip card terminal when the chip card is coupled to the chip card terminal within a pre-defined period of time and resetting the state from the second to the first state; and
   erasing the authorization code from the memory location if an unsecure situation is detected during the pre-defined period of time.

* * * * *